(12) United States Patent
Chen et al.

(10) Patent No.: US 10,698,106 B2
(45) Date of Patent: Jun. 30, 2020

(54) OBSTACLE DETECTING METHOD AND APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Dongming Chen, Beijing (CN); He Yan, Beijing (CN); Hao Wang, Beijing (CN); Liang Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 146 days.

(21) Appl. No.: 15/914,988

(22) Filed: Mar. 7, 2018

(65) Prior Publication Data

US 2018/0267166 A1    Sep. 20, 2018

(30) Foreign Application Priority Data

Mar. 16, 2017  (CN) .......................... 2017 1 0157992

(51) Int. Cl.
*G01S 13/00*   (2006.01)
*B60W 30/08*   (2012.01)
(Continued)

(52) U.S. Cl.
CPC ............. *G01S 13/931* (2013.01); *G01S 13/08* (2013.01); *G01S 13/89* (2013.01); *G01S 17/08* (2013.01);
(Continued)

(58) Field of Classification Search
CPC ....... B60W 40/00; B60W 40/06; G01C 21/00; G01C 21/26; G01C 21/34; G01S 13/00;
(Continued)

(56) References Cited

U.S. PATENT DOCUMENTS

| 9,008,890 B1* | 4/2015 | Herbach | ............... | B60W 30/00 |
| | | | | 701/26 |
| 2018/0196437 A1* | 7/2018 | Herbach | ............... | B60W 30/00 |

(Continued)

FOREIGN PATENT DOCUMENTS

| CN | 101975951 A | 2/2011 |
| CN | 102779280 A | 11/2012 |
| CN | 104374376 A | 2/2015 |
| CN | 106199558 A | 12/2016 |

OTHER PUBLICATIONS

First Office action and search report from CN app. No. 201710157992. 2, dated Feb. 3, 2020, with English translation from Global Dossier.
(Continued)

*Primary Examiner* — Yonel Beaulieu
(74) *Attorney, Agent, or Firm* — Ladas & Parry, LLP

(57) ABSTRACT

The present disclosure provides an obstacle detecting method and apparatus, a device and a storage medium, wherein the method comprises: obtaining a 3D point cloud collected by a driverless vehicle during travel; determining a set of vertexes and a set of edges respectively according to the obtained 3D point cloud; clustering vertexes in the set of vertexes according to the set of edges to obtain a smallest generated tree as an obstacle detection result. The solutions of the present disclosure can be applied to reduce workload and improve the accuracy of detection results.

27 Claims, 5 Drawing Sheets

(51) Int. Cl.

| | |
|---|---|
| *G01S 17/00* | (2020.01) |
| *G06K 9/00* | (2006.01) |
| *G08G 1/16* | (2006.01) |
| *G01S 13/931* | (2020.01) |
| *G01S 13/89* | (2006.01) |
| *G01S 13/08* | (2006.01) |
| *G06T 7/12* | (2017.01) |
| *G01S 17/08* | (2006.01) |
| *G01S 17/89* | (2020.01) |
| *G06T 7/194* | (2017.01) |
| *G01S 17/931* | (2020.01) |

(52) U.S. Cl.
CPC .............. *G01S 17/89* (2013.01); *G01S 17/931* (2020.01); *G06K 9/00201* (2013.01); *G06K 9/00805* (2013.01); *G06T 7/12* (2017.01); *G06T 7/194* (2017.01); *G06T 2200/04* (2013.01); *G06T 2207/10028* (2013.01); *G06T 2207/30261* (2013.01)

(58) Field of Classification Search
CPC ........ G01S 13/931; G01S 13/08; G01S 13/89; G06T 7/00; G06T 7/12
See application file for complete search history.

(56) References Cited

U.S. PATENT DOCUMENTS

| | | | |
|---|---|---|---|
| 2018/0218226 A1* | 8/2018 | Wellington | G05D 1/0088 |
| 2018/0304898 A1* | 10/2018 | Yoshikawa | B60W 40/06 |
| 2019/0088148 A1* | 3/2019 | Jacobus | G08G 9/02 |

OTHER PUBLICATIONS

"Research on point cloud segmentation using a minimum spanning tree", Journal of Image and Graphics, vol. 17, No. 7, pp. 858-865, Jul. 2012.

"Study on Detection Methods of Robot Obstacles in Complex Field Environment", Wang Sheng, China Excellent Master Thesis Full-text Database Information Technology Series (Monthly) Automation Technology, May 15, 2015 Issue 05, pp. 140-414.

"Image Segmentation Based on Clustering", Chen Jiaye, Full-text Data of Excellent Master's Thesis in China Library Information Technology Series (Monthly) Computer Software and Computer Application, No. 01, Jan. 15, 2015.

"Study on Point Cloud Simplified Algorithm of Downsampling Based on Voxel Grid", Yuan Hua et al. vol. 39, No. 17, 2015, pp. 43-47.

* cited by examiner

OBSTACLE DETECTING METHOD AND APPARATUS, DEVICE AND STORAGE MEDIUM

The present application claims the priority of Chinese Patent Application No. 2017101579922, filed on Mar. 16, 2017, with the title of "Obstacle detecting method and apparatus, device and storage medium", the entire disclosure of which is hereby incorporated by reference in its entirety.

FIELD OF THE DISCLOSURE

The present disclosure relates to driverless vehicle technologies, and particularly to an obstacle detecting method and apparatus, a device and a storage medium.

BACKGROUND OF THE DISCLOSURE

An driverless vehicle means sensing a surrounding environment of a vehicle through various sensors, and controlling a steering direction and a speed of the vehicle according to information about roads, vehicle positions and obstacles obtained by sensing, so that the vehicle can safely and reliably travel on the road.

A laser radar is an important sensor for the driverless vehicle to sense a 3-dimensional environment. After scanning around a scenario, the laser radar returns a point cloud of the 3-dimensional space of the scenario, namely, 3D point cloud, including 3-dimensional coordinates of each point, laser reflection intensity and the like.

It is possible to, based on the collected 3D point cloud, perform detection of the obstacle and feed it back to a planning control system to perform an obstacle-avoiding operation. It can be seen that obstacle detection is directly related to the travel safety of the driverless vehicle and is of very important significance. The obstacles may include pedestrians, motor vehicles, bicycles and the like appearing on the road.

In the prior art, detection of obstacles is performed mainly in the following manner: first, collecting many 3D point clouds and marking all obstacle samples, then using these samples to learn/train a model, and when an actual detection needs to be performed, inputting the collected 3D point clouds into the model to obtain a detection result of obstacles.

However, the above manner has certain problems in practical application: for example, in an early period, obstacle samples need to be marked from a lot of 3D point clouds to train the model, which is time-consuming and laborious and increases the workload. Furthermore, in actual use, there might be confronted with an obstacle that is never met upon training so that the obstacle cannot be detected, i.e., missed detection of the obstacle might occur, thereby reducing the accuracy of the detection result.

SUMMARY OF THE DISCLOSURE

In view of the above, the present disclosure provides an obstacle detecting method and apparatus, a device and a storage medium, which can reduce workload and improve the accuracy of detection results.

Specific technical solutions are as follows:

An obstacle detecting method, comprising:

obtaining a 3D point cloud collected by a driverless vehicle during travel;

determining a s et of vertexes and a set of edge s respectively according to the obtained 3D point cloud;

clustering vertexes in the set of vertexes according to the set of edges to obtain a smallest generated tree as an obstacle detection result.

An obstacle detecting apparatus, comprising: an obtaining unit and a detecting unit;

the obtaining unit is configured to obtain a 3D point cloud collected by a driverless vehicle during travel, and send the 3D point cloud to the detecting unit; the detecting unit is configured to determine a set of vertexes and a set of edges respectively according to the 3D point cloud, and cluster vertexes in the set of vertexes according to the set of edges to obtain a smallest generated tree as an obstacle detection result.

A computer device, comprising a memory, a processor and a computer program which is stored on the memory and runnable on the processor, the processor, upon executing the program, implementing the above-mentioned method.

A computer-readable storage medium on which a computer program is stored, the program, when executed by the processor, implementing the aforesaid method.

As can be seen from the above introduction, the solution of the present disclosure is employed without performing sample labeling and model training, thereby reducing the workload as compared with the prior art. Furthermore, the obstacle detecting manner is adapted to detect any type of obstacle, thereby reducing occurrence of missed detection and further improving accuracy of the detection result as compared with the prior art.

DETAILED DESCRIPTION OF PREFERRED EMBODIMENTS

Generally speaking, a distance between points on the same object is smaller, and a distance between points on different objects is larger. Therefore, the distance between points may be use d to distinguish different objects. The foregoing id ea is used in the present disclosure to perform obstacle detection.

Technical solutions of the present disclosure will be described in more detail in conjunction with figures and embodiments to make technical solutions of the present disclosure clear and more apparent.

Figure 1:
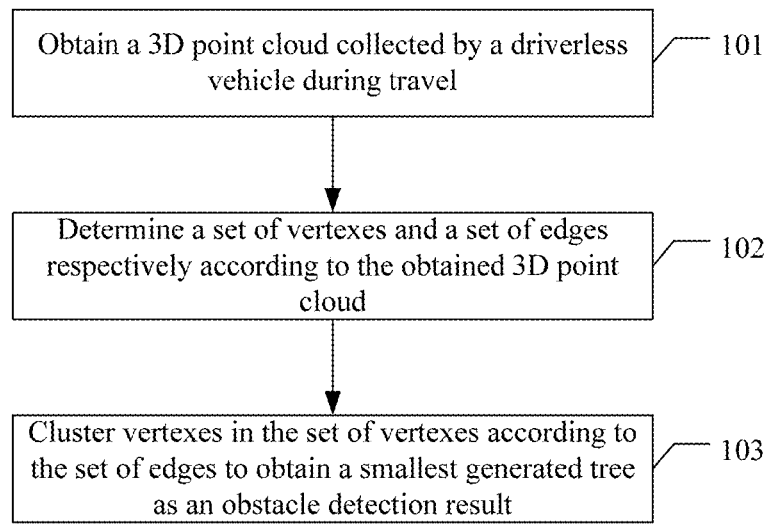
FIG. 1 is a flow chart of an embodiment of an obstacle detecting method according to the present disclosure.

FIG. 1 is a flow chart of an embodiment of an obstacle detecting method according to the present disclosure. As shown in FIG. 1, the embodiment comprises the following specific implementation mode:

At 101 is obtained a 3D point cloud collected by a driverless vehicle during travel;

At 102, a set of vertexes and a set of edges are respectively determined according to the obtained 3D point cloud;

At 103, vertexes in the set of vertexes are clustered according to the set of edges to obtain a smallest generated tree as an obstacle detection result.

During the travel of the driverless vehicle, a laser radar collects data constantly. After the 3D point cloud returned by the laser radar is obtained each time, processing is performed in the manner of the above 102-103, i.e., detection of obstacles is performed.

Specifically, the present disclosure provides three obstacle detecting manners which will be introduced respectively.

1) Manner 1

In this manner, each point in the 3D point cloud may be considered as a vertex, and all vertexes may be used to form a set of vertexes.

Furthermore, regarding each vertex, it is possible to respectively determine vertexes in a predetermined range (e.g., a predetermined radius) around the vertex, and respectively calculate a Euclidean distance between each of the determined vertexes and said vertex.

Then, regarding each Euclidean distance, it is feasible to consider a connection line between two vertexes corresponding to the Euclidean distance as an edge, consider the Euclidean distance corresponding to each edge as a length of the edge, and use all edges to form a set of edges.

A specific value of the predetermined range may be determined according to actual needs.

For example, regarding vertex x, it is feasible to employ a kdtree manner to search for vertexes, for example vertex a, vertex b and vertex c, within a range of 1 meter around it, and respectively calculate the Euclidean distance between the vertex a and vertex x, between vertex b and vertex x and between vertex c and vertex x, to obtain a total of three Euclidean distances.

Regarding each Euclidean distance, a connection line between two vertexes corresponding the Euclidean distance may be considered as an edge, namely, the connection line between vertex a and vertex x, the connection line between vertex b and vertex x and the connection line between vertex c and vertex x are respectively considered as an edge, thereby obtaining a total of 3 edges. The connection line is usually a straight line.

As such, in this manner, one or more edge may be obtained for each vertex, and all edges jointly form the set of edges.

Then, discrete vertexes may be clustered into several classes. Each class is one obstacle. It is desirable that points on the same obstacle are aggregated together, whereas points on different obstacles are separated.

Based on the above idea, a usual processing manner is: by virtue of an idea of region growth, randomly selecting a seed point first, then clustering surrounding points whose distances are less than a threshold as a class, and then spreading outward circle by circle to obtain a plurality of classes.

However, this manner employs a fixed threshold with an undesirable robustness because point clouds on nearby obstacles are dense whereas point clouds on obstacles far away are s parse. Therefore, obstacles at different distances cannot be clustered using the same threshold.

To this end, the present disclosure provides an improved algorithm, briefly called MstSegmentation algorithm.

Specifically, in an initial state, each vertex in the set of vertex may be considered as a class; then, all edges in the set of edges are sorted in an ascending order of length, and said all edges are processed as follows in a sequential order after the sorting: determining whether an edge satisfies an adding condition; if yes, connecting two vertexes corresponding to the edge (e.g., connecting via a straight line) for class clustering, namely, adding the edge in the diagram; clustering two classes into one class whenever one edge is added; as such, after processing of all edges in the set of edges is completed, a smallest generated tree may be obtained by clustering. Each tree is a class.

The manner of determining whether each edge satisfies the adding condition is: calculating a threshold of the class where two vertexes corresponding to the edge lies; determining that the edge satisfies the adding condition if the length of the edge is simultaneously smaller than two calculated thresholds, and if a ring does not app ear after two vertexes corresponding to the edge are connected.

For example, two vertexes corresponding to edge x' are vertex a' and vertex b' respectively. It is necessary to respectively calculate a threshold of a class where the vertex a' lies and a threshold of a class where vertex b' lies. A length of the edge x' is a value of the Euclidean distance between the vertex a' and vertex b'.

Regarding the vertex a', it is possible to first determine the number Num of vertexes included in the class where the vertex a' lies, and determine a length L of the longest edge in the class where the vertex a' lies, then divide a predetermined constant K by Num, add up the obtained quotient with the L, and consider the sum as a threshold of the class where the vertex a' lies.

Likewise, regarding the vertex b', it is possible to first determine the number Num of vertexes included in the class where the vertex b' lies, and determine a length L of the longest edge in the class where the vertex b' lies, then divide a predetermined constant K by Num, add up the obtained quotient with the L, and consider the sum as a threshold of the class where the vertex b' lies.

If the length of the edge x' is simultaneously smaller than the threshold of the class where the vertex a' lies and the threshold of the class where the vertex b' lies, and if a ring does not appear after the vertex a' and vertex b' are connected, it is determined that the edge x' satisfies the adding condition, and correspondingly, the vertex a' and vertex b' are connected to cluster the class where the vertex a' lies and the class where the vertex b' lies into one class.

A value of the above K depends on actual needs.

Each edge in the set of edges is processed in the above manner of processing the edge x' until processing of all edges in the set of edges is completed, thereby obtaining one or more smallest generated tree.

It can be seen that the threshold changes constantly during the above processing procedure, namely, it is not fixed, but calculated according to local information of each class (a length of the longest edge and the number of vertexes), thereby exhibiting a better robustness than the fixed threshold.

For example, the larger a spacing between points on a remote obstacle is, the larger the value of L is. Furthermore, the smaller the number of points on the remote obstacle is, the smaller the value of Num is, otherwise K/Num is larger, and correspondingly, the threshold corresponding to the remote obstacle is larger.

2) Manner 2

In practical application, the number of points included by the 3D point cloud acquired each time is very large, for example, veldyne64 used extensively currently can acquire about 130,000 points each time. If the set of vertexes and set of edges are determined for the 130,000 points in the manner as stated in manner 1, particularly if the set of edge is determined, it is too time-consuming and thereby reduces the processing speed.

Therefore, manner 2 provides an acceleration policy, namely, sample the 3D point cloud and determine the set of vertexes and the set of edges according to the sampling result.

Figure 2:
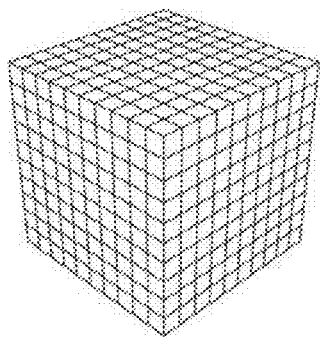
FIG. 2 is a schematic diagram of 3D grids according to the present disclosure.

Specifically, first, the 3D point cloud may be projected on the 3D grid. As shown in FIG. 2, FIG. 2 is a schematic diagram of the 3D grids according to the present disclosure. The specific number of grids may be determined according to actual needs. Each grid records a mean value of all points in the grid.

That is to say, it is feasible to, for each grid, calculate a mean value of all points in the grid, consider a point corresponding to the mean value as a vertex, and use all vertexes to form the set of vertexes.

Furthermore, it is feasible to, for each vertex, determine vertexes within a predetermined range located around the vertex, and respectively calculate Euclidean distances between the determined vertexes and said vertex.

What's more, it is feasible to, for each Euclidean distance, consider a connection line between two vertexes corresponding to the Euclidean distance as an edge, consider the Euclidean distance corresponding to each edge as a length of the edge, and use all edges to form the set of edges.

After the set of vertexes and the set of edges are obtained, the vertexes in the set of vertexes may be clustered according to the set of edges according to the MstSegmentation algorithm as stated in manner 1, to obtain the smallest generated tree as an obstacle detection result. For specific implementation, please refer to relevant depictions in manner 1, and detailed depictions are not provided any more.

3) Manner 3

As stated above, in practical application, the number of points included by the 3D point cloud acquired each time is very large, for example, 130,000 points. If the set of vertexes and set of edges are determined for the 130,000 points in the manner as stated in manner 1, particularly if the set of edge is determined, it is too time-consuming and thereby reduces the processing speed.

Therefore, manner 3 provides another acceleration policy, namely, generate a height diagram according to the 3D point cloud, and determine the set of vertexes and the set of edges according to the height diagram.

Figure 3:
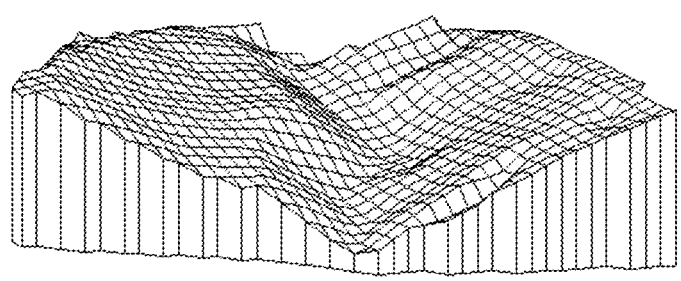
FIG. 3 is a schematic diagram of a manner of projecting a 3D point cloud on a 2-dimensional grid parallel to the ground surface according to the present disclosure.

Specifically, the 3D point cloud may be projected on a 2-dimensional grid parallel to the ground surface. FIG. 3 is a schematic diagram of a manner of projecting the 3D point cloud on a 2-dimensional grid parallel to the ground surface according to the present disclosure.

As shown in FIG. 3, it is feasible, for each grid, calculate a mean value of all points in a column corresponding to the grid in x direction and y direction, select a maximum value of all points in the column corresponding to the grid in z direction, consider a point corresponding to the mean value as a pixel point, and consider the maximum value as a height value corresponding to the pixel point.

That is to say, each grid records the mean value of points in the corresponding column in x direction and y direction, and the maximum value in z direction. Theoretically, the maximum value, the mean value or a median value may be used in the z direction. However, tests show that the best effect is achieved when the maximum value is used, that is, the 3D point cloud is projected on a 2D picture, the picture records the maximum value, also called the highest value, in z direction, so the picture may be called the height diagram.

Figure 4:
FIG. 4 is a schematic diagram of the 3D point cloud according to the present disclosure.
Figure 5:
FIG. 5 is a schematic diagram of a height diagram according to the present disclosure.

As shown in FIG. 4 and FIG. 5, FIG. 4 is a schematic diagram of the 3D point cloud according to the present disclosure, FIG. 5 is a schematic diagram of the height diagram according to the present disclosure, and a gray value and a height value of each pixel point in FIG. 5 are in direct proportion.

Each pixel point may be considered as one vertex, and all vertexes may be used to form the set of vertexes.

Furthermore, it is feasible to, for each vertex, respectively calculate Euclidean distances between other vertexes within a N*N range of the vertex and the vertex using the values in x direction and y direction and the height value, wherein N is an odd number larger than 1 and its specific value depends on actual needs.

For example, the value of N is 3. For a central point in the 3*3 range, Euclidean distances between other points except the central point and the central point may be calculated respectively.

Furthermore, it is feasible to, for each Euclidean distance, consider a connection line between two vertexes corresponding to the Euclidean distance as an edge, consider the Euclidean distance corresponding to each edge as a length of the edge, and use all edges to form the set of edges.

After the set of vertexes and the set of edges are obtained, the vertexes in the set of vertexes may be clustered according to the set of edges according to the MstSegmentation algorithm as stated in manner 1, to obtain the smallest generated tree as an obstacle detection result. For specific implementation, please refer to relevant depictions in manner 1, and detailed depictions are not provided any more.

Since the detection result is obtained in the 2D space, so the detection result needs to be projected into the 3D space. Specific implementation is of the prior art.

The above describes totally three obstacle detecting manners, namely, manner 1, manner 2 and manner 3, which are the same in terms of detection accuracy, but distinct in the processing speed, wherein both manner 2 and manner 3 can substantially improve the speed of obtaining the set of vertexes and set of edges, thereby enhancing the processing speed of the whole obstacle detecting procedure.

Tests show that as for the 3D point cloud obtained each time, the processing speed in manner 1 is 1000 ms, the processing speed in manner 2 is 60 ms, and the processing speed in manner 3 may reach 8 ms. A faster processing speed can better satisfy the driverless vehicle's requirements for real time.

In addition, as compared with the prior art, the obstacle detecting manner according to the present disclosure is employed without performing sample labeling and model training, thereby reducing the workload. Furthermore, the obstacle detecting manner is adapted to detect any type of obstacle, thereby reducing occurrence of missed detection and further improving accuracy of the detection result.

In addition, in practical application, the obstacle detecting manner according to the present disclosure may be combined with the known obstacle detecting manner to further improve the accuracy of the detection result.

The above introduces the method embodiment. The solution of the present disclosure will be further described through an apparatus embodiment.

Figure 6:
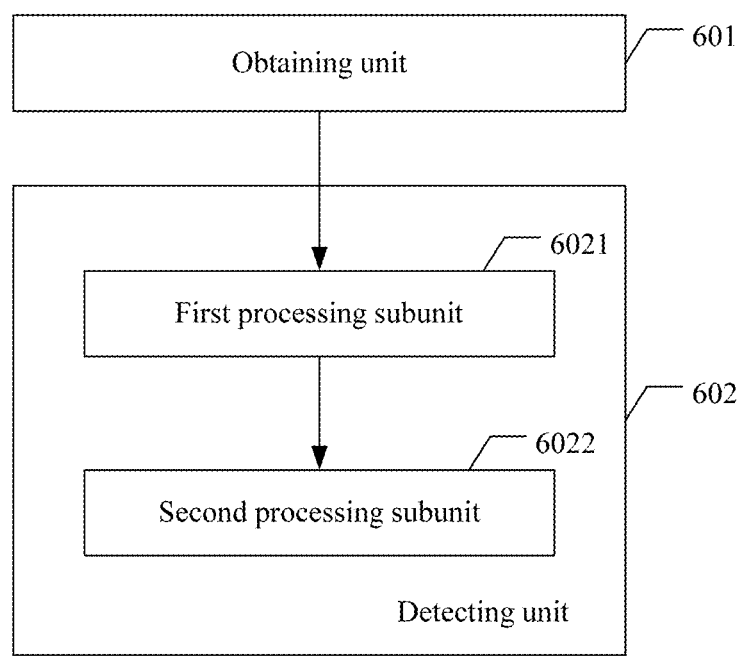
FIG. 6 is a structural schematic diagram of components of an obstacle detecting apparatus according to an embodiment of the present disclosure.

FIG. 6 is a structural schematic diagram of components of an obstacle detecting apparatus according to an embodiment of the present disclosure, comprising: an obtaining unit 601 and a detecting unit 602.

The obtaining unit 601 is configured to obtain a 3D point cloud collected by a driverless vehicle during travel, and send the 3D point cloud to the detecting unit 602.

The detecting unit 602 is configured to determine a set of vertexes and a set of edges respectively according to the obtained 3D point cloud, and cluster vertexes in the set of vertexes according to the set of edges to obtain a smallest generated tree as an obstacle detection result.

As shown in FIG. 6, the detecting unit 602 may specifically comprise: a first processing subunit 6021 and a second processing subunit 6022.

The first processing subunit 6021 is configured to determine the set of vertexes and the set of edges respectively according to the obtained 3D point cloud. There may be three different implementation modes.

For example, the first processing subunit 6021 may consider each point in the 3D point cloud as a vertex, and use all vertexes to form the set of vertexes; regarding each vertex, respectively determine vertexes in a predetermined range around the vertex, and respectively calculate a Euclidean distance between each of the determined vertexes and said vertex; regarding each Euclidean distance, consider a connection line between two vertexes corresponding to the Euclidean distance as an edge, consider the Euclidean distance corresponding to each edge as a length of the edge, and use all edges to form a set of edges.

Or, the first processing subunit 6021 may perform downsampling for the obtained 3D point cloud, and determine the set of vertexes and the set of edges according to a downsampling result.

Specifically, the first processing subunit 6021 may perform the following processing:

project the 3D point cloud on a 3D grid;

for each grid, calculate a mean value of all points in the grid, consider a point corresponding to the mean value as a vertex, and use all vertexes to form the set of vertexes;

for each vertex, determine vertexes within a predetermined range located around the vertex, and respectively calculate Euclidean distances between the determined vertexes and said vertex.

for each Euclidean distance, consider a connection line between two vertexes corresponding to the Euclidean distance as an edge, consider the Euclidean distance corresponding to each edge as a length of the edge, and use all edges to form the set of edges.

Again alternatively, the first processing subunit 6021 may generate a height diagram according to the obtained 3D point cloud, and determine the set of vertexes and the set of edges according to the height diagram.

Specifically, the first processing subunit 6021 may perform the following processing:

projecting the 3D point cloud on a 2-dimensional grid parallel to the ground surface;

for each grid, calculate a mean value of all points in a column corresponding to the grid in x direction and y direction, select a maximum value of all points in the column corresponding to the grid in z direction, consider a point corresponding to the mean value as a pixel point, and consider the maximum value as a height value corresponding to the pixel point to obtain the height diagram;

consider each pixel point as one vertex, and use all vertexes to form the set of vertexes;

for each vertex, respectively calculate Euclidean distances between other vertexes within a N*N range of the vertex and the vertex using the values in x direction and y direction and the height value, wherein N is an odd number larger than 1;

for each Euclidean distance, consider a connection line between two vertexes corresponding to the Euclidean distance as an edge, consider the Euclidean distance corresponding to each edge as a length of the edge, and use all edges to form the set of edges.

Whatever of the above manners is employed, after the set of vertexes and the set of edges are determined, the second processing subunit 6022 may perform the following processing:

in an initial state, consider each vertex in the set of vertex as a class;

sort all edges in the set of edges in an ascending order of length, and process said all edges as follows in a sequential order after the sorting: determining whether the edge satisfies an adding condition; if yes, connecting two vertexes corresponding to the edge for class clustering;

after processing of all edges in the set of edges is completed, obtain a clustered smallest generated tree.

Wherein, satisfying the adding condition may mean that the length of the edge is simultaneously smaller than thresholds of classes where two vertexes corresponding to the edge lie, and a ring does not appear after the two vertexes corresponding to the edge are connected.

A threshold of a class where each vertex lies is equal to L+K/Num;

wherein Num represents the number of vertexes included in the class where the vertex lies;

L represents a length of the longest edge in the class where the vertex lies;

K represents a preset constant.

A specific workflow of the apparatus embodiment shown in FIG. 6 will not be detailed any more here, and reference may be made to corresponding depictions in the above method embodiment.

Figure 7:
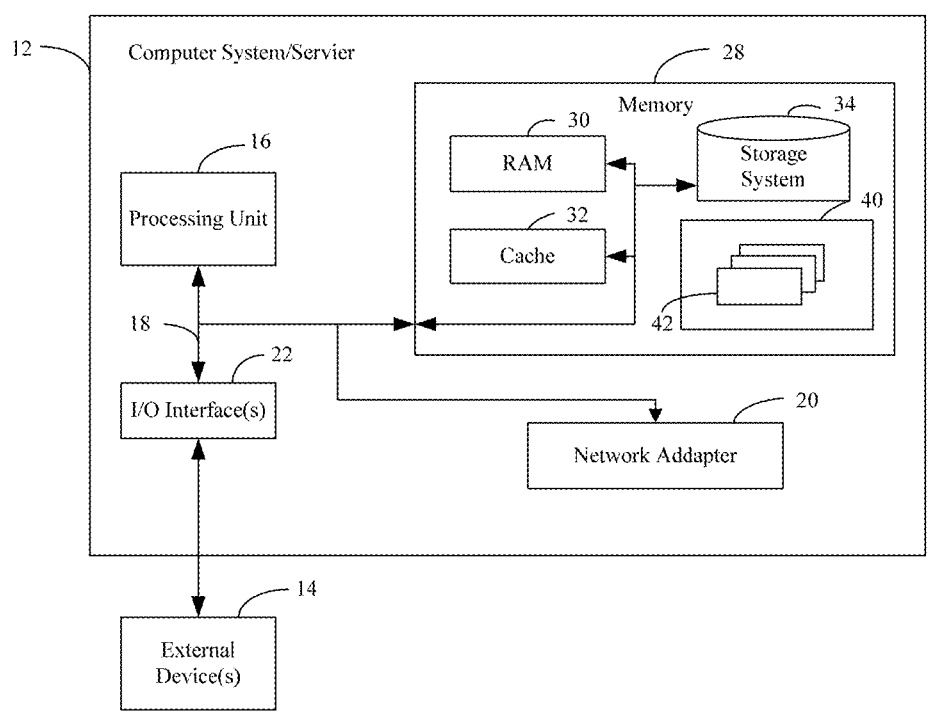
FIG. 7 illustrates a block diagram of an example computer system/server 12 adapted to implement an implementation mode of the present disclosure.

FIG. 7 illustrates a block diagram of an example computer system/server 12 adapted to implement an implementation mode of the present disclosure. The computer system/server 12 shown in FIG. 7 is only an example and should not bring about any limitation to the function and scope of use of the embodiments of the present disclosure.

As shown in FIG. 7, the computer system/server 12 is shown in the for m of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 7 and typically called a "hard drive"). Although not shown in FIG.

7, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a net working environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 7, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1, namely, obtaining a 3D point cloud collected by a driverless vehicle during travel, determining a set of vertexes and a set of edges respectively according to the obtained 3D point cloud, and clustering vertexes in the set of vertexes according to the set of edges to obtain a smallest generated tree as an obstacle detection result.

Wherein "determining a set of vertexes and a set of edges respectively according to the obtained 3D point cloud, and clustering vertexes in the set of vertexes according to the set of edges to obtain a smallest generated tree" may be implemented in three manners, namely, the above-mentioned manner 1, manner 2 and manner 3.

The present disclosure further provides a computer-readable storage medium on which a computer program is stored. The program, when executed by a processor, can implement the method in the embodiment shown in FIG. 1.

The computer-readable medium of the present embodiment may employ any combinations of one or m ore computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. M ore specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An obstacle detecting method, wherein the method comprises:
    obtaining a 3D point cloud collected by a driverless vehicle during travel;
    determining a set of vertexes and a set of edges respectively according to the obtained 3D point cloud;
    clustering vertexes in the set of vertexes according to the set of edges to obtain a smallest generated tree as an obstacle detection result.

2. The method according to claim 1, wherein,
    the determining the set of vertexes and the set of edges respectively according to the obtained 3D point cloud comprises:
    considering each point in the 3D point cloud as a vertex, and using all vertexes to form the set of vertexes;
    for each vertex, respectively determining vertexes within a predetermined range around the vertex, and respectively calculating a Euclidean distance between each of the determined vertexes and said vertex;
    for each Euclidean distance, respectively considering a connection line between two vertexes corresponding to the Euclidean distance as an edge, considering the Euclidean distance corresponding to each edge as a length of the edge, and using all edges to form the set of edges.

3. The method according to claim 2, wherein,
    the clustering vertexes in the set of vertexes according to the set of edges to obtain a smallest generated tree as an obstacle detection result comprises:
    in an initial state, respectively considering each vertex in the set of vertex as a class;
    sorting all edges in the set of edges in an ascending order of length, and processing said all edges as follows in a sequential order after the sorting:
    determining whether the edge satisfies an adding condition; if yes, connecting two vertexes corresponding to the edge for class clustering;
    after processing of all edges in the set of edges is completed, obtaining the smallest generated tree obtained from the clustering.

4. The method according to claim 3, wherein,
    the determining whether the edge satisfies an adding condition comprises:
    respectively determining thresholds of classes where two vertexes corresponding to the edge lie;
    determining that the edge satisfies the adding condition if the length of the edge is simultaneously smaller than the calculated two thresholds, and if a ring does not appear after the two vertexes corresponding to the edge are connected.

5. The method according to claim 4, wherein,
    the respectively determining thresholds of classes where two vertexes corresponding to the edge lie comprises:
    respectively performing the following processing for each vertex corresponding to the edge:
    determining the number Num of vertexes included in the class where the vertex lies;
    determining a length L of the longest edge in the class where the vertex lies;
    dividing a predetermined constant K by Num, adding up the obtained quotient with the L, and considering the sum as a threshold of the class where the vertex lies.

6. The method according to claim 1, wherein,
    the determining the set of vertexes and the set of edges respectively according to the 3D point cloud comprises:
    performing down-sampling for the 3D point cloud, and determining the set of vertexes and the set of edges according to a down-sampling result.

7. The method according to claim 6, wherein,
    the performing down-sampling for the 3D point cloud, and determining the set of vertexes and the set of edges according to a down-sampling result comprises:
    projecting the 3D point cloud on a 3D grid;
    for each grid, respectively calculating a mean value of all points in the grid, considering a point corresponding to the mean value as a vertex, and using all vertexes to form the set of vertexes;
    for each vertex, respectively determining vertexes within a predetermined range located around the vertex, and respectively calculating Euclidean distances between each of the determined vertexes and said vertex;
    for each Euclidean distance, respectively considering a connection line between two vertexes corresponding to the Euclidean distance as an edge, considering the Euclidean distance corresponding to each edge as a length of the edge, and using all edges to form the set of edges.

8. The method according to claim 1, wherein,
    the determining the set of vertexes and the set of edges respectively according to the 3D point cloud comprises:
    generating a height diagram according to the 3D point cloud, and determining the set of vertexes and the set of edges according to the height diagram.

9. The method according to claim 8, wherein,
    the generating a height diagram according to the 3D point cloud, and determining the set of vertexes and the set of edges according to the height diagram comprises:
    projecting the 3D point cloud on a 2-dimensional grid parallel to the ground plane;
    for each grid, respectively calculating a mean value of all points in a column corresponding to the grid in x direction and y direction, selecting a maximum value of all points in the column corresponding to the grid in z direction, considering a point corresponding to the mean value as a pixel point, and considering the maximum value as a height value corresponding to the pixel point to obtain the height diagram;
    considering each pixel point as one vertex, and using all vertexes to form the set of vertexes;
    for each vertex, calculating Euclidean distances between other vertexes within a N*N range of the vertex and the vertex using the values in x direction and y direction and the height value respectively, N being an odd number larger than 1;
    for each Euclidean distance, respectively considering a connection line between two vertexes corresponding to the Euclidean distance as an edge, considering the Euclidean distance corresponding to each edge as a length of the edge, and using all edges to form the set of edges.

10. A computer device, comprising a memory, a processor and a computer program which is stored on the memory and runnable on the processor, wherein the processor, upon executing the program, implements the following operations:
obtaining a 3D point cloud collected by a driverless vehicle during travel;
determining a set of vertexes and a set of edges respectively according to the obtained 3D point cloud;
clustering vertexes in the set of vertexes according to the set of edges to obtain a smallest generated tree as an obstacle detection result.

11. A computer-readable storage medium on which a computer program is stored, wherein the program, when executed by the processor, implements following operations:
obtaining a 3D point cloud collected by a driverless vehicle during travel;
determining a set of vertexes and a set of edges respectively according to the obtained 3D point cloud;
clustering vertexes in the set of vertexes according to the set of edges to obtain a smallest generated tree as an obstacle detection result.

12. The computer device according to claim 10, wherein, the operation of determining the set of vertexes and the set of edges respectively according to the obtained 3D point cloud comprises:
considering each point in the 3D point cloud as a vertex, and using all vertexes to form the set of vertexes;
for each vertex, respectively determining vertexes within a predetermined range around the vertex, and respectively calculating a Euclidean distance between each of the determined vertexes and said vertex;
for each Euclidean distance, respectively considering a connection line between two vertexes corresponding to the Euclidean distance as an edge, considering the Euclidean distance corresponding to each edge as a length of the edge, and using all edges to form the set of edges.

13. The computer device according to claim 12, wherein, the operation of clustering vertexes in the set of vertexes according to the set of edges to obtain a smallest generated tree as an obstacle detection result comprises:
in an initial state, respectively considering each vertex in the set of vertex as a class;
sorting all edges in the set of edges in an ascending order of length, and processing said all edges as follows in a sequential order after the sorting:
determining whether the edge satisfies an adding condition; if yes, connecting two vertexes corresponding to the edge for class clustering;
after processing of all edges in the set of edges is completed, obtaining the smallest generated tree obtained from the clustering.

14. The computer device according to claim 13, wherein, the operation of determining whether the edge satisfies an adding condition comprises:
respectively determining thresholds of classes where two vertexes corresponding to the edge lie;
determining that the edge satisfies the adding condition if the length of the edge is simultaneously smaller than the calculated two thresholds, and if a ring does not appear after the two vertexes corresponding to the edge are connected.

15. The computer device according to claim 14, wherein, the operation of respectively determining thresholds of classes where two vertexes corresponding to the edge lie comprises:
respectively performing the following processing for each vertex corresponding to the edge:
determining the number Num of vertexes included in the class where the vertex lies;
determining a length L of the longest edge in the class where the vertex lies;
dividing a predetermined constant K by Num, adding up the obtained quotient with the L, and considering the sum as a threshold of the class where the vertex lies.

16. The computer device according to claim 10, wherein, the operation of determining the set of vertexes and the set of edges respectively according to the 3D point cloud comprises:
performing down-sampling for the 3D point cloud, and determining the set of vertexes and the set of edges according to a down-sampling result.

17. The computer device according to claim 16, wherein, the operation of performing down-sampling for the 3D point cloud, and determining the set of vertexes and the set of edges according to a down-sampling result comprises:
projecting the 3D point cloud on a 3D grid;
for each grid, respectively calculating a mean value of all points in the grid, considering a point corresponding to the mean value as a vertex, and using all vertexes to form the set of vertexes;
for each vertex, respectively determining vertexes within a predetermined range located around the vertex, and respectively calculating Euclidean distances between each of the determined vertexes and said vertex;
for each Euclidean distance, respectively considering a connection line between two vertexes corresponding to the Euclidean distance as an edge, considering the Euclidean distance corresponding to each edge as a length of the edge, and using all edges to form the set of edges.

18. The computer device according to claim 10, wherein, the operation of determining the set of vertexes and the set of edges respectively according to the 3D point cloud comprises:
generating a height diagram according to the 3D point cloud, and determining the set of vertexes and the set of edges according to the height diagram.

19. The computer device according to claim 18, wherein, the operation of generating a height diagram according to the 3D point cloud, and determining the set of vertexes and the set of edges according to the height diagram comprises:
projecting the 3D point cloud on a 2-dimensional grid parallel to the ground plane;
for each grid, respectively calculating a mean value of all points in a column corresponding to the grid in x direction and y direction, selecting a maximum value of all points in the column corresponding to the grid in z direction, considering a point corresponding to the mean value as a pixel point, and considering the maximum value as a height value corresponding to the pixel point to obtain the height diagram;
considering each pixel point as one vertex, and using all vertexes to form the set of vertexes;

for each vertex, calculating Euclidean distances between other vertexes within a N*N range of the vertex and the vertex using the values in x direction and y direction and the height value respectively, N being an odd number larger than 1;

for each Euclidean distance, respectively considering a connection line between two vertexes corresponding to the Euclidean distance as an edge, considering the Euclidean distance corresponding to each edge as a length of the edge, and using all edges to form the set of edges.

20. The computer-readable storage medium according to claim 11, wherein, the operation of determining the set of vertexes and the set of edges respectively according to the obtained 3D point cloud comprises:

considering each point in the 3D point cloud as a vertex, and using all vertexes to form the set of vertexes;

for each vertex, respectively determining vertexes within a predetermined range around the vertex, and respectively calculating a Euclidean distance between each of the determined vertexes and said vertex;

for each Euclidean distance, respectively considering a connection line between two vertexes corresponding to the Euclidean distance as an edge, considering the Euclidean distance corresponding to each edge as a length of the edge, and using all edges to form the set of edges.

21. The computer-readable storage medium according to claim 20, wherein, the operation of clustering vertexes in the set of vertexes according to the set of edges to obtain a smallest generated tree as an obstacle detection result comprises:

in an initial state, respectively considering each vertex in the set of vertex as a class;

sorting all edges in the set of edges in an ascending order of length, and processing said all edges as follows in a sequential order after the sorting:

determining whether the edge satisfies an adding condition; if yes, connecting two vertexes corresponding to the edge for class clustering;

after processing of all edges in the set of edges is completed, obtaining the smallest generated tree obtained from the clustering.

22. The computer-readable storage medium according to claim 21, wherein, the operation of determining whether the edge satisfies an adding condition comprises:

respectively determining thresholds of classes where two vertexes corresponding to the edge lie;

determining that the edge satisfies the adding condition if the length of the edge is simultaneously smaller than the calculated two thresholds, and if a ring does not appear after the two vertexes corresponding to the edge are connected.

23. The computer-readable storage medium according to claim 22, wherein, the operation of respectively determining thresholds of classes where two vertexes corresponding to the edge lie comprises:

respectively performing the following processing for each vertex corresponding to the edge:

determining the number Num of vertexes included in the class where the vertex lies;

determining a length L of the longest edge in the class where the vertex lies;

dividing a predetermined constant K by Num, adding up the obtained quotient with the L, and considering the sum as a threshold of the class where the vertex lies.

24. The computer-readable storage medium according to claim 11, wherein, the operation of determining the set of vertexes and the set of edges respectively according to the 3D point cloud comprises:

performing down-sampling for the 3D point cloud, and determining the set of vertexes and the set of edges according to a down-sampling result.

25. The computer-readable storage medium according to claim 24, wherein, the operation of performing down-sampling for the 3D point cloud, and determining the set of vertexes and the set of edges according to a down-sampling result comprises:

projecting the 3D point cloud on a 3D grid;

for each grid, respectively calculating a mean value of all points in the grid, considering a point corresponding to the mean value as a vertex, and using all vertexes to form the set of vertexes;

for each vertex, respectively determining vertexes within a predetermined range located around the vertex, and respectively calculating Euclidean distances between each of the determined vertexes and said vertex;

for each Euclidean distance, respectively considering a connection line between two vertexes corresponding to the Euclidean distance as an edge, considering the Euclidean distance corresponding to each edge as a length of the edge, and using all edges to form the set of edges.

26. The computer-readable storage medium according to claim 11, wherein, the operation of determining the set of vertexes and the set of edges respectively according to the 3D point cloud comprises:

generating a height diagram according to the 3D point cloud, and determining the set of vertexes and the set of edges according to the height diagram.

27. The computer-readable storage medium according to claim 26, wherein, the operation of generating a height diagram according to the 3D point cloud, and determining the set of vertexes and the set of edges according to the height diagram comprises:

projecting the 3D point cloud on a 2-dimensional grid parallel to the ground plane;

for each grid, respectively calculating a mean value of all points in a column corresponding to the grid in x direction and y direction, selecting a maximum value of all points in the column corresponding to the grid in z direction, considering a point corresponding to the mean value as a pixel point, and considering the maximum value as a height value corresponding to the pixel point to obtain the height diagram;

considering each pixel point as one vertex, and using all vertexes to form the set of vertexes;

for each vertex, calculating Euclidean distances between other vertexes within a N*N range of the vertex and the vertex using the values in x direction and y direction and the height value respectively, N being an odd number larger than 1;

for each Euclidean distance, respectively considering a connection line between two vertexes corresponding to the Euclidean distance as an edge, considering the Euclidean distance corresponding to each edge as a length of the edge, and using all edges to form the set of edges.

* * * * *